United States Patent
Hopper

(10) Patent No.: US 7,125,032 B2
(45) Date of Patent: Oct. 24, 2006

(54) POLYUREA COATED TRAILER

(75) Inventor: Randy Wayne Hopper, Flippin, AR (US)

(73) Assignee: Wood Manufacturing Company, Inc., Flippin, AR (US)

( * ) Notice: Subject to any disclaimer, the term of this patent is extended or adjusted under 35 U.S.C. 154(b) by 0 days.

(21) Appl. No.: 11/039,073

(22) Filed: Jan. 20, 2005

(65) Prior Publication Data

US 2005/0218625 A1 Oct. 6, 2005

Related U.S. Application Data

(60) Provisional application No. 60/560,339, filed on Apr. 6, 2004.

(51) Int. Cl.
*B60P 3/10* (2006.01)
(52) U.S. Cl. .............................. 280/414.1; 427/421.1
(58) Field of Classification Search ............ 280/414.1; 427/421.1, 422–427.1
See application file for complete search history.

(56) References Cited

U.S. PATENT DOCUMENTS

| | | |
|---|---|---|
| 3,974,924 A | 8/1976 | Ullman, Jr. |
| 5,266,671 A | 11/1993 | Primeaux, II |
| 5,292,145 A | 3/1994 | Ostrand |
| 5,814,398 A * | 9/1998 | Kronz et al. ............... 428/338 |
| 6,387,519 B1 | 5/2002 | Anderson et al. |
| 6,539,630 B1 | 4/2003 | Fabick, Jr. |
| 6,593,417 B1 | 7/2003 | Anderson et al. |
| 6,755,348 B1 * | 6/2004 | Langeman ................... 239/10 |
| 6,854,755 B1 * | 2/2005 | MacKarvich ............ 280/414.1 |

FOREIGN PATENT DOCUMENTS

WO 2005/007732 A2 * 1/2005

OTHER PUBLICATIONS

Hi-Tech Liners, http://web.archive.org/web/20010723052559/www.hi-techliners.com/HTApps.htm, dated Jul. 20, 2001.*
GatorHyde LP, Web Page—GatorHyde Polyurea Truck Bed Liner, Date of Reference—Dec. 8, 2002; Printed on Jan. 20, 2006, pp. 1-3.
GatorHyde LP, Web Page—GatorHyde Spray In Truck Bed Liner, Date of Reference—Unknown, pp. 1-2.
GatorHyde LP, GatorHyde Polyurea Bedliner, Spec Data, Date of Reference—Unknown, Printed on Jan. 20, 2006, p. 1-2.
GatorHyde LP, Web Page—GatorHyde Polyurea Trailer Coating, Elastomer Specialties, Inc., Polymers Division, Installation Bulletin, Date of Reference—Unknown, Printed on Jan. 20, 2006, pp. 1-2.

(Continued)

*Primary Examiner*—Kevin Hurley
(74) *Attorney, Agent, or Firm*—Merchant & Gould P.C.

(57) ABSTRACT

The present invention relates to polyurea composition coated trailers and methods of making the same. In an embodiment, the present invention is directed to a trailer comprising a frame having a front side and a back side, at least one axle coupled to the frame, a plurality of wheels coupled to the at least one axle, and a polyurea coating, wherein the polyurea coating encapsulates at least a portion of the frame. In an embodiment, the present invention is directed to a method for protecting a metal trailer from corrosion comprising cleaning the surfaces of a metal trailer and applying a layer of a polyurea composition to the surfaces of the metal trailer.

17 Claims, 4 Drawing Sheets

OTHER PUBLICATIONS

GatorHyde LP, Web Page—GatorHyde Polyurea Race Car Trailer, Elastomer Specialties, Inc. Polymers Division. Installation Bulletin, Date of Reference—Unknown, Printed on Jan. 20, 2006, pp. 1-2.
GatorHyde LP, Web Page—GatorHyde Truck Bedliner, GatorHyde 50. Elastomer Specialties. Inc. Polymers Division, Installation Bulletin, Date of Reference—Unknown, Printed on Jan. 20, 2006, pp. 1-3.
Author Unknown, "Ready to cash in on the new ployurea coatings market?", Dec. 2003, pp. 1-3.
Author Shiwei William Guan, 100% Solids Polyurethane and Polyurea Coatings Technology, Mar. 2003, pp. 49-58.
"Real Rhino Protection", Rhino Linings U.S.A., http://web.archive.org/web/19991011214617/www.rhinolinings.com/realrhino/trailer.html, Apr. 23, 1999 (last printed Sep. 19, 2005).

* cited by examiner

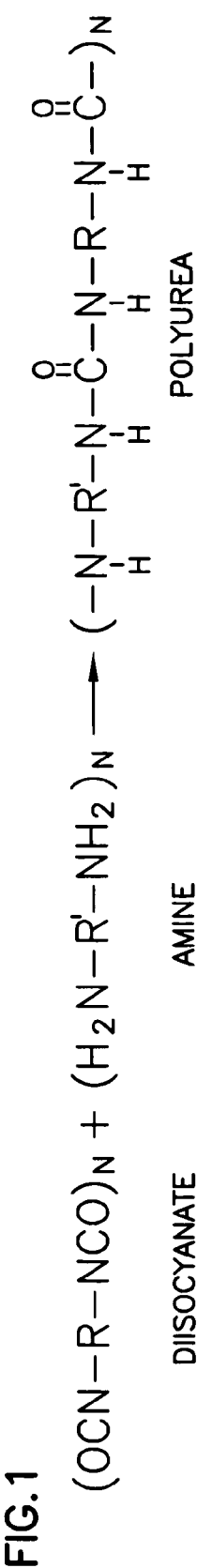
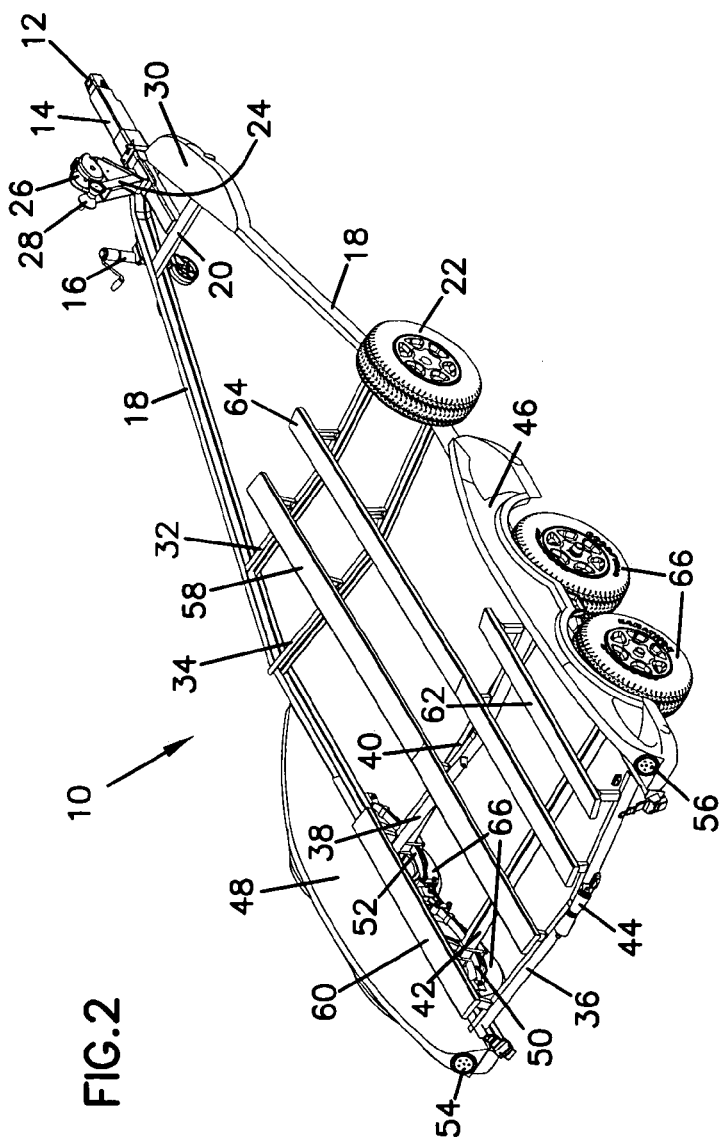

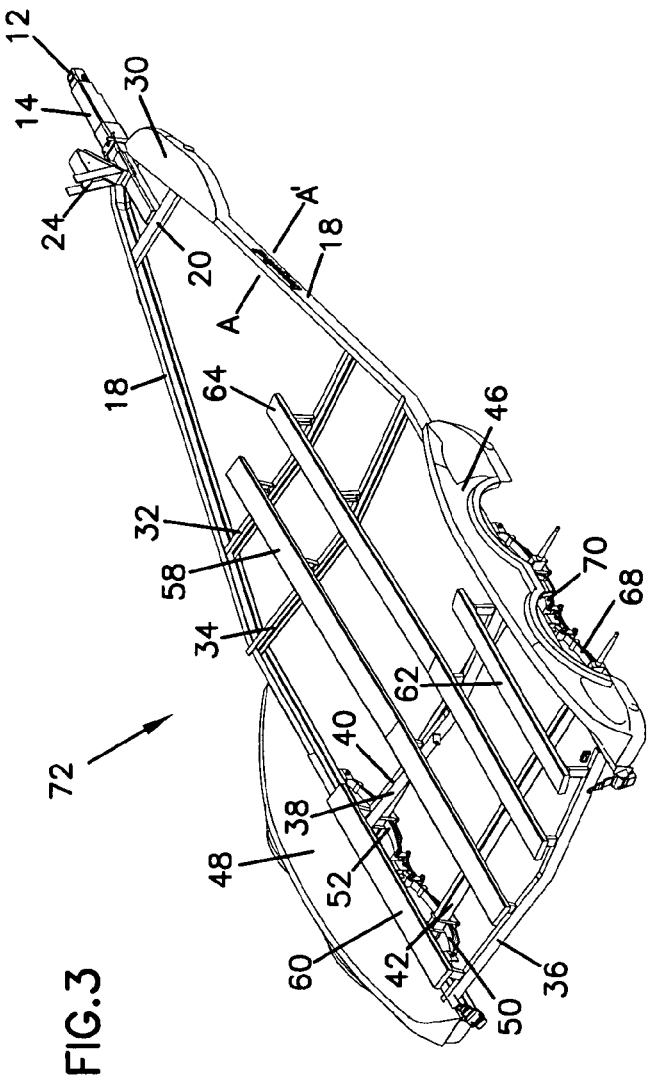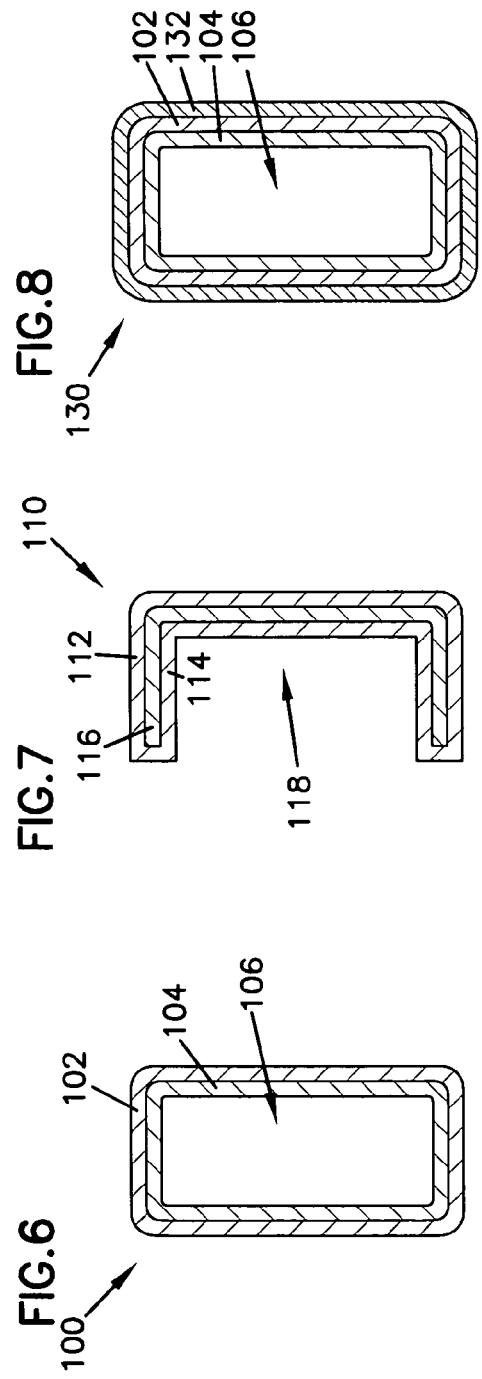

POLYUREA COATED TRAILER

This application claims priority of U.S. patent application Ser. No. 60/560,339, filed Apr. 6, 2004, which application is incorporated herein by reference.

FIELD OF THE INVENTION

The present invention relates to trailers. In particular, the present invention relates to trailers that are coated with a protective layer.

BACKGROUND OF THE INVENTION

Trailers have utility for transporting various materials and objects. For example, boats and other watercraft can be transported on trailers. The structural elements of a trailer can be made of many different materials. Frequently, trailers are made of steel components. Steel is strong and relatively cost efficient. However, steel is subject to damage from corrosion.

To protect against corrosion, trailers frequently are provided with a protective coating. For example, a coating of paint may be applied to protect a trailer made of steel from corrosion. The coating of paint prevents moisture from reaching the surface of the metal where is may cause corrosion. The coating of paint may also protect the steel from compounds that may enhance corrosion such as road salt and the like.

However, protective finishes can be breached, leaving parts of the trailer unprotected. For example, as trailers are pulled over roadways, the surfaces of may be hit with roadway debris. Small stones may be kicked up by the tires and chip off pieces of the protective finish. Other sorts of roadway debris may also come in contact with the protective finish and damage it. In addition, the protective finish may be breached through physical contact of the boat trailer with other objects. For example, other objects may contact the trailer when a boat is loaded or unloaded from the trailer.

Protective finishes on trailers also serve an aesthetic purpose. The finishes may be colored to match the intended cargo, such as the particular boat, or may be colored in accord with the logo of the manufacturer. Accordingly, breaches of the protective finish may make the appearance less aesthetic and therefore diminish the value of the trailer.

While common automotive paint is a typical material used for a protective finish, other finish materials are used. For example, polyurethane compositions are known for use as a protective finish. However, polyurethane compositions are susceptible to damage from UV-light exposure. This can be an issue with boat trailers as they are frequently parked in full exposure to sunlight. Moreover, polyurethane compositions can lose their flexible and protective properties at temperature extremes. Therefore, a protective finish made from a polyurethane composition will be more susceptible to failure at, for example, very low temperatures.

Polyurethane systems also typically utilize a catalyst to promote proper curing. Use of catalysts in curing processes can make application more difficult as the process is usually temperature and moisture sensitive. Additionally, the catalyst may become a deteriorating element in some polyurethane systems.

Therefore, a need exists for a trailer that is protected from damage and provides a lasting aesthetic appearance.

SUMMARY OF THE INVENTION

One inventive aspect of the present disclosure relates to polyurea composition coated trailers and methods of making the same. Another inventive aspect is directed to a trailer comprising a frame having a front side and a back side, at least one axle coupled to the frame, a plurality of wheels coupled to the at least one axle, and a polyurea coating, wherein the polyurea coating encapsulates at least a portion of the frame. A further inventive aspect is directed to a method for protecting a metal trailer from corrosion comprising cleaning the surfaces of a metal trailer and applying a layer of a polyurea composition to the surfaces of the metal trailer.

Examples of a variety of aspects in addition to those described above are set forth in the description that follows. It is to be understood that the forgoing summary and the following detailed description are exemplary and explanatory only and are not restrictive of the broad inventive aspects that underlie the examples disclosed herein.

DRAWINGS

The invention may be more completely understood in connection with the following drawings, in which:

FIG. 1 shows a typical polyurea reaction.

FIG. 2 is a perspective view of a trailer coated in accordance with an embodiment of the invention.

FIG. 3 is a perspective view of a trailer frame as it would appear just after the coating process in an embodiment of the invention.

FIG. 6 is a cross-sectional view of the trailer frame of FIG. 3 taken along line A–A'.

FIG. 7 is a cross-sectional view of an alternative embodiment of the trailer frame of FIG. 3 taken along line A–A'.

FIG. 8 is a cross-sectional view of a trailer frame taken along line A–A' of FIG. 3, in an embodiment showing a paint layer disposed on a polyurea layer.

Figure 4:
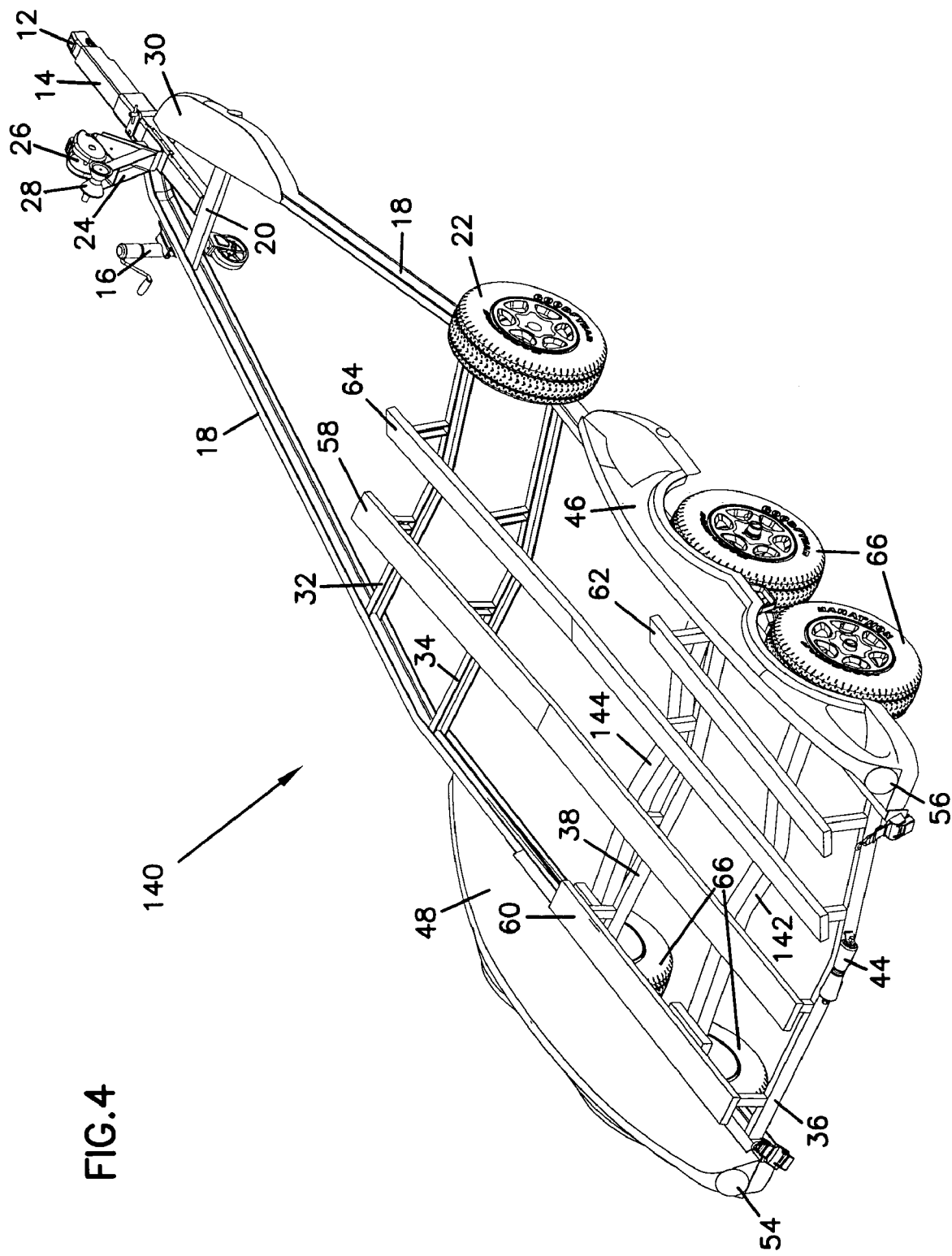
FIG. 4 is a perspective view of a trailer with a torsion axle in accordance with an embodiment of the invention.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

In an embodiment, the present invention is directed to a trailer comprising a frame having a front side and a back side, at least one axle coupled to the frame, a plurality of wheels coupled to the at least one axle, and a polyurea coating, wherein the polyurea coating covers at least a portion of the frame. The polyurea coating may also fully encapsulate portions of the frame. In an embodiment, the present invention is directed to a method for protecting a metal trailer from corrosion comprising cleaning the surfaces of a metal trailer and applying a coating of a polyurea composition to the surfaces of the metal trailer. Various components of the invention will now be described in greater detail.

Coating Compositions:

Compositions of an embodiment of the present invention comprise a polyurea composition. A polyurea is generated from the reaction of a diisocyanate or polyisocyanate with a compound containing amine groups. A prototypical polyurea formation reaction is shown in FIG. 1. Accordingly, polyurea systems comprise at least two components. The first component comprises an isocynate and the second component is a component that contains a reactive amine group. As referred to herein, the term polyurea composition refers to a composition containing polyurea-type chemical bonding and excludes polyurethane-type chemical bonding. Thus, the term "polyurea composition" does not include polyurea/polyurethane blends.

The first component may be an aliphatic diisocyanate, such as 1,4-diisocyanatobutane, 1,6-diisocyanatohexane (HDI), 1,12-diisocyanatododecane, 2-methyl-1,5-diisocyanatopentane, or an aliphatic polyisocyanate. The first component may also be a cycloaliphatic diisocyanate such as methylenedicyclohexylene-4,4'-diisocyanate, 3-isocyanatomethyl-3,5,5-trimethylcyclohexyl isocyanate (isophorone diisocyanate, IPDI), 2,2,4-trimethylhexyl diisocyanate, or cyclohexylene-1,4-diisocyanate. The first component may be an aromatic-aliphatic diisocyanate such as m-xylylene diisocyanate or tetramethyl-m-xylylene diisocyanate. The first component may also be an aromatic diisocyanate, such as 2,6-toluene diisocyanate (TDI), 1,3- and 1,4-bis(2-isocyanatoprop-2-yl)benzene (TMXDI), 2,5-toluene diisocyanate, 2,4-toluene diisocyanate, m-phenylene diisocyanate, p-phenylene diisocyanate, methylene bis(o-chlorophenyl diisocyanate), methylenediphenylene 4,4'-diisocyanate, polycarbodiimide-modified methylenediphenylene diisocyanate, (4,4'-diisocyanato-3,3', 5,5'-tetraethyl) diphenylmethane, 4,4'-diisocyanato-3,3'-dimethoxybiphenyl(o-dianisidine diisocyanate), 5-chloro-2, 4-toluene diisocyanate, or 1-chloromethyl-2,4-diisocyanato benzene. The first component may also comprise mixtures of different isocyanates. One of skill in the art will appreciate that many different di- or poly-isocyanates could be used depending on the particular application.

The second component can be an aliphatic or aromatic amine resin. Suitable polyamines include ethylene diamine, 1,2- and 1,3-diaminopropane, 1,4-diaminobutane, 1,6-diaminohexane, isophorone diamine, isomer mixture of 2,2,4- and 2,4,4-trimethyl hexamethylene diamine, 2-methyl pentamethylene diamine, diethylene triamine, 1,3- and 1,4-xylene diamine, α,α,α',α'-tetramethyl-1,3- and -1,4-xylylene diamine and 4,4-diaminodicyclohexyl methane. Other compounds to be considered as suitable diamines include hydrazine, hydrazine hydrate and substituted hydrazines, such as N-methyl hydrazine, N,N'-dimethyl hydrazine and homologues thereof, as well as acid dihydrazides, adipic acid, β-methyl adipic acid, sebacic acid, hydracrylic acid and terephthalic acid, semicarbazidoalkylene hydrazides, such as β-semicarbatidopropanoic acid hydrazide, semicarbazidoalkylene carbazine esters, such as 2-semicarbazidoethyl carbazine ester or aminosemicarbazide compounds, such as β-aminoethyl semi-carbazidocarbonate. One of skill in the art will appreciate that many different di- or poly-amines could be used depending on the particular application.

Polyurea systems may also include other components to modify the properties of the end product. By way of example, polyurea systems may also comprise nonreactive additives such as fillers, pigments, stabilizers, plasticizers, organic tackifiers, antioxidants, compatibilizers and the like.

Polyurea systems generally do not use a catalyst to speed up the curing process. The two components cure very rapidly after they are combined, for example, in as few as 5–15 seconds. The product resulting from the reaction is generally inert. However, the properties of the resulting polyurea composition will vary as a function of isocyanate-to-amine ratio, polyisocyanate and polyamine architecture, order of reactant addition, mixing speed, temperature, applicator throughput, applicator configuration and size, residence time, residence time distribution, and whether any fillers, additives, or property modifiers are added to the composition. One of skill in the art will appreciate that the properties of the resulting polyurea composition can be modified as desired through changes to these variables.

Polyurea coating systems are available commercially from a variety of sources. One such system is TURBO-LINER® 117502, available from Turboliner Inc., 1 West Cameron Avenue, Kellogg, ID. 83837.

Coated Components:

In an embodiment of the invention, metal components of a trailer are fully encapsulated with the polyurea coating of the invention. In other embodiments, at least a portion of the trailer is coated with a polyurea composition. In some embodiments, the trailer is a boat trailer. Referring now to FIG. 2, a completed boat trailer 10 is shown in accordance with an embodiment of the invention. The boat trailer 10 has a frame that comprises side rails 18 connected together toward the front by a transverse hitch bar support member 20 and the hitch bar 14. In an embodiment of the invention, the side rails 18 are encapsulated by a polyurea coating. In an embodiment of the invention, the transverse hitch bar support member 20 and/or the hitch bar 14 are encapsulated by a polyurea coating. Toward the middle, the side rails 18 are connected by transverse frame members 32 and 34; and at the aft the side rails 18 are connected by aft transverse frame members 36 and 38. In an embodiment of the invention, the transverse frame members 32 and 34, and the aft transverse frame members 36 and 38 are encapsulated by a polyurea coating. At the front of the hitch bar 14, a hitch coupling 12 is attached. A winch stand 24 is attached to the hitch bar 14 and supports the placement of a winch 26. In an embodiment of the invention, the winch stand 24 is encapsulated by a polyurea coating. A winch cable guide 28 is mounted just in back of the winch 26. A trailer jack 16 is shown mounted on a side rail 18, however, it may be mounted onto other components as a simple matter of design choice. A step member 30, may also be mounted on a side rail 18 for the convenience of the trailer user. In an embodiment of the invention, the step member is encapsulated by a polyurea coating. In the trailer shown in FIG. 2, there is a front axle 40 and a rear axle 42. In an embodiment of the invention, the front axle 40 and/or the rear axle 42 are encapsulated by a polyurea coating. However, one of skill in the art will understand the invention disclosed herein is not limited to double-axle trailers. A keel roller 44 is mounted on aft transverse frame member 36 and helps the functions of the trailer when boats are loaded and unloaded. In the trailer shown in FIG. 2, there are four wheels 66 and a spare wheel 22. The wheels are partially covered by the right wheel fender 46 and the left wheel fender 48. The front axle 40 is attached to the frame through a left front axle spring 52 and a right front axle spring 70. Similarly, the rear axle 42 is attached to the frame through a left rear axle spring 50 and a right rear axle spring 68. FIG. 4 shows an embodiment of the invention 140 with a torsion type axle system. This embodiment has a front torsion axle 144 and a rear torsion axle 142.

The trailer has a pair of rear brake lights 54, 56. The trailer also has elements designed to support the boat on the trailer. In the embodiment shown in FIG. 2, the trailer has a pair of inner hull skids 58, 64 and a pair of outer hull skids 60, 62. However, one of skill in the art will appreciate that many other elements may be used to support the boat on the trailer including roller systems and the like. Therefore, any sort of structure used for cradling a boat may be coated with a polyurea composition in accordance with the invention.

Figure 5:
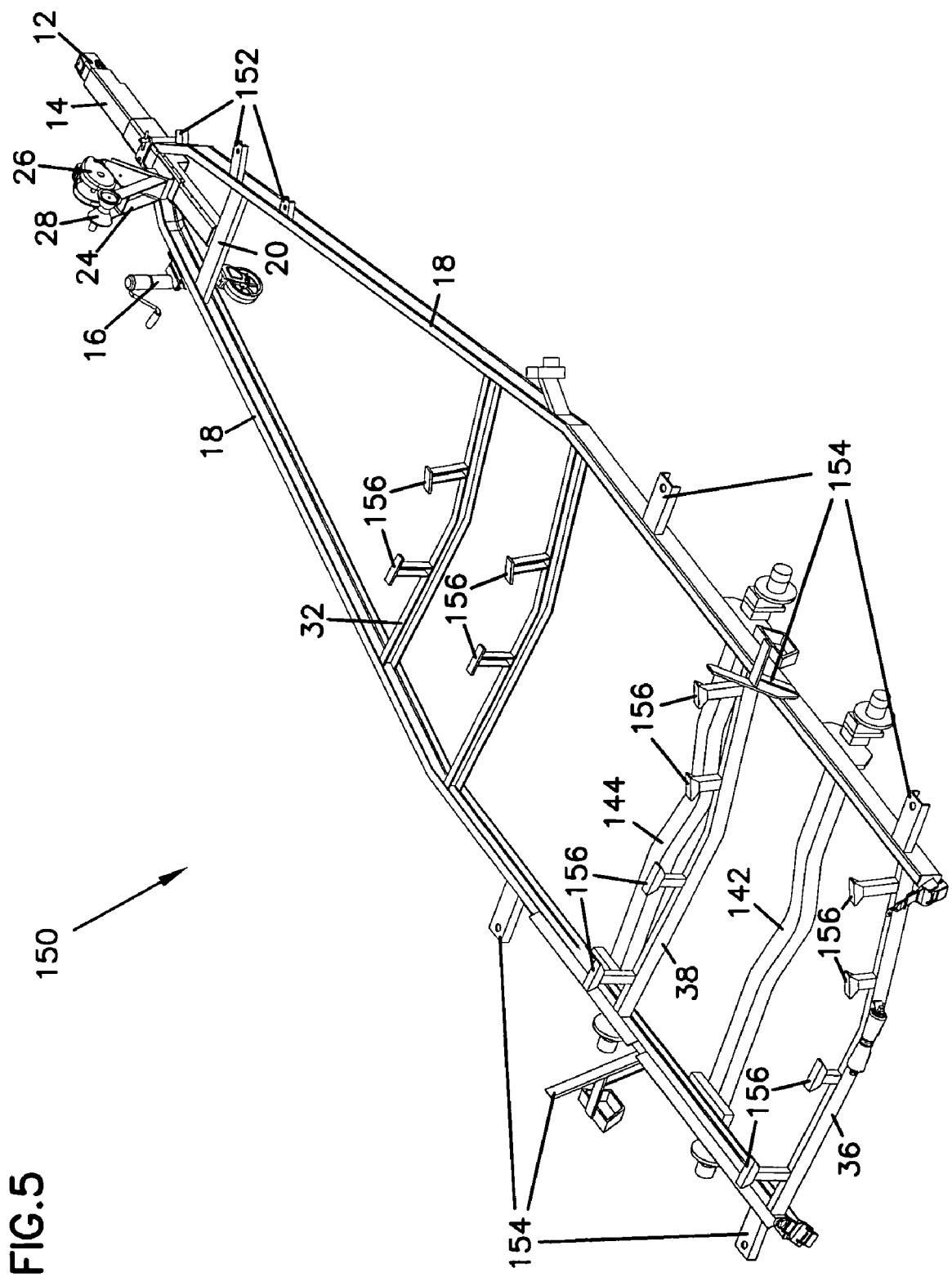
FIG. 5 is perspective view of the trailer of FIG. 4 with some components removed.

In FIG. 5, an embodiment of the invention with a torsion type axle system is shown 150 with various components removed. In this figure, a plurality of step member supports 152 are shown which underlie the step member 30. In an embodiment of the invention, the step member supports 152 are coated with a polyurea composition. A plurality of skid supports 156 are attached to components of the frame including transverse frame members 32 and 34 and aft transverse frame members 36 and 38. In an embodiment of the invention, the skid supports 156 are coated with a polyurea composition. A plurality of fender support members 154 are attached to the side rails 18. In an embodiment of the invention, the fender support members 154 are coated with a polyurea composition.

While the invention has been described above in the context of a boat trailer, one of skill in the art will appreciate that many types of trailers could be similarly coated with a polyurea composition without deviating from the spirit of the invention. Also, while many components of the trailer are described as being encapsulated, these same components may also be at least partially coated. As used herein, the term "encapsulated" means to be fully surrounded when viewed in cross-section at a particular angle through the particular component.

Mode of Application:

Polyurea compositions have a high curing speed and a very short mixing time. Accordingly, in some embodiments, the polyurea composition is applied in a manner to account for the high curing speed. In an embodiment, high pressure is used in an application device to properly mix the components. High temperature may also be used to lower the viscosity of the components to ensure optimal mixing. The application device may comprise a proportioning pump and a spray gun. Such devices may be referred to as plural component proportioning systems and are available from many commercial suppliers. By way of example, one spray gun that may be used is the LS GUN®, made by Glasscraft, available from Turboliner Inc., 1 West Cameron Avenue, Kellogg, ID. 83837. The LS GUN® has an orifice of 0.013 inches.

In an embodiment, the surfaces of the boat trailer to be coated are first prepared. Various mechanical and chemical means may be used to prepare a metal surface for subsequent coating. By way of example, the surface of the boat trailer to be coated may be prepared by sand blasted provide a clean surface free of oil. However, one of skill in the art will appreciate that there are many ways of preparing a metal surface before application of a coating.

Before coating the trailer with a polyurea composition, those components that are not to be coated are removed (or are not yet added). FIG. 3 shows a trailer 72 that has just been coated in accordance with an embodiment of the invention.

After the metal surfaces have been prepared and those components that are not to be coated are removed, the polyurea composition of the invention is applied. In some embodiments this is conducted with a plural component proportioning system and the composition is sprayed onto the metal surfaces of the trailer frame.

A polyurea coating that is too thin may not be as durable. In some embodiments, the polyurea composition is applied in a layer that is greater than or equal to 0.015 inches thick. A polyurea coating that is too thick may not be economical. In some embodiments, the polyurea composition is applied in a layer that is less than or equal to 0.035 inches thick. In an embodiment, the polyurea composition may be applied in a layer from 0.015 inches to 0.035 inches thick. In a particular embodiment, the polyurea composition may be applied in a layer that is 0.025 inches thick.

The way in which the polyurea coating is applied can allow it to encapsulate various components. By way of example, spraying the polyurea composition onto the metal surfaces of the trailer frame can allow the polyurea coating to encapsulate the frame components. Referring now to FIG. 6, a cross-sectional view of a trailer frame taken along line A–A' of FIG. 3 is shown. The coated frame 100 comprises a rectangular metal bar 104 that defines a metal bar lumen 106. The polyurea coating 102 encapsulates the rectangular metal bar 104 such that there are substantially no exterior surfaces of the rectangular metal bar 104 that are not coated with the polyurea composition. However, one of skill in the art is aware that metal bar stock used for making structural elements can come in a variety of different shapes and configurations. Referring now to FIG. 7 a cross-sectional view of an alternative embodiment of the trailer frame taken along line A–A' of FIG. 3 is shown. In FIG. 7, the coated frame 110 comprises a C-shaped metal bar 116 that partially defines a C-shaped metal bar lumen 118. The polyurea coating has an interior coating 114 and an exterior coating 112, such that the C-shaped metal bar 116 is encapsulated by the polyurea coating.

Paint Coatings

The inventors of the present application have surprisingly found that the chip-resistance of paint itself is improved when it is applied over a polyurea coating when compared with paint that is applied directly onto a metal substrate. While not intending to be bound by theory, it is believed that some of the mechanical forces from impact are absorbed by the polyurea coating resulting in less energy being absorbed by the paint coating leading to reduced fracturing of the paint surface.

In an embodiment, the invention comprises a boat trailer coated with a polyurea composition as described above along with a paint coating disposed over the polyurea coating. In an embodiment, the paint comprises a polyurethane component. An example of a suitable paint includes AUE-200 available from PPG paints, at least through their distributor R and E Automotive Paint and Supply, 57 Avalon Lane, Mountain Home, Ark. 72653. The layer of paint may be about 0.0015 to 0.0020 inches thick.

Referring now to FIG. 8, a cross-sectional view of a trailer frame taken along line A–A' of FIG. 3 is shown in an embodiment showing a paint layer disposed on a polyurea layer. The coated frame 130 comprises a rectangular metal bar 104 that defines a metal bar lumen 106. The polyurea coating 102 encapsulates the rectangular metal bar 104 such that there are substantially no exterior surfaces of the rectangular metal bar 104 that are not coated with the polyurea composition. The paint coating 132 is disposed on the polyurea coating 102.

It will be appreciated that, although the implementation of the invention described above is directed to a boat trailer, the present invention may be used with other types of trailers, and is not limited to boat trailers. In addition, while the present invention has been described with reference to particular implementations, those skilled in the art will recognize that many changes may be made hereto without departing from the spirit and scope of the present invention.

I claim:

1. A method for protecting a metal trailer from corrosion comprising:
    cleaning the surfaces of a metal trailer; and
    applying a layer of a polyurea composition to the surfaces of the metal trailer to encapsulate at least a portion of the metal trailer.

2. The method of claim 1, further comprising the step of applying a layer of paint over the layer of the polyurea composition.

3. The method of claim 1, wherein the step of cleaning the surfaces of the metal trailer comprises degreasing the surfaces of the metal trailer.

4. The method of claim 1, wherein the step of applying the layer of the polyurea composition to the surfaces of the metal trailer comprises spraying the polyurea composition onto the surfaces of the metal trailer.

5. The method of claim 1, wherein the step of applying the layer of the polyurea composition to the surfaces of the metal trailer comprises applying the layer of the polyurea composition directly onto a bare metal substrate.

6. The method of claim 1, wherein the step of applying the layer of the polyurea composition to the surfaces of the metal trailer comprises applying the layer of the polyurea composition onto the surfaces of a boat trailer.

7. The method of claim 1, wherein the step of applying the layer of the polyurea composition to the surfaces of the metal trailer comprises applying the layer of the polyurea composition onto the surfaces of the metal trailer before components of the metal trailer that are not to be coated with the polyurea composition have been assembled to the trailer.

8. The method of claim 1, wherein the step of applying the layer of the polyurea composition to the surfaces of the metal trailer comprises applying the layer of the polyurea composition onto the surfaces of the metal trailer before applying a layer of paint to the surfaces of the metal trailer.

9. The method of claim 1, wherein the step of applying the layer of the polyurea composition to the surfaces of the metal trailer comprises encapsulating first and second siderails of a frame of the metal trailer with the polyurea composition.

10. The method of claim 1, wherein the step of applying the layer of the polyurea composition to the surfaces of the metal trailer comprises encapsulating a plurality of transverse frame members of a frame of the metal trailer with the polyurea composition.

11. The method of claim 1, wherein the step of applying the layer of the polyurea composition to the surfaces of the metal trailer comprises encapsulating an axle of the metal trailer with the polyurea composition.

12. The method of claim 1, further comprising a step of encapsulating a winch stand coupled to a frame of the metal trailer with the polyurea composition.

13. The method of claim 1, wherein the step of applying the layer of the polyurea composition to the surfaces of the metal trailer comprises encapsulating a boat hull support structure of the metal trailer with the polyurea composition.

14. The method of claim 1, wherein the step of applying the layer of the polyurea composition to the surfaces of the metal trailer comprises encapsulating a hitch structure of the metal trailer with the polyurea composition.

15. A method for protecting a trailer from corrosion comprising:
    applying a layer of a polyurea composition to a surface of the trailer; and
    applying a layer of paint over the layer of the polyurea composition.

16. A method according to claim 15, wherein the trailer is a boat trailer.

17. A method according to claim 16, wherein the step of applying the layer of the polyurea composition to the surface of the boat trailer comprises encapsulating siderails of a frame of the boat trailer with the polyurea composition before applying the layer of paint over the layer of the polyurea composition.

* * * * *

UNITED STATES PATENT AND TRADEMARK OFFICE
CERTIFICATE OF CORRECTION

PATENT NO. : 7,125,032 B2  
APPLICATION NO. : 11/039073  
DATED : October 24, 2006  
INVENTOR(S) : Hopper It is certified that error appears in the above-identified patent and that said Letters Patent is hereby corrected as shown below:

In The Specification

Col. 3, line 18: "(HDI), 1,12-diisocyanatododecane," should read --(HDI), 1,1 2-diisocyanatododecane,--

Signed and Sealed this
Tenth Day of May, 2016

Michelle K. Lee
*Director of the United States Patent and Trademark Office*